United States Patent
Uchida

(10) Patent No.: US 7,144,073 B2
(45) Date of Patent: Dec. 5, 2006

(54) VEHICLE FRONT STRUCTURE

(75) Inventor: Masafumi Uchida, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 43 days.

(21) Appl. No.: 11/006,534

(22) Filed: Dec. 8, 2004

(65) Prior Publication Data
US 2005/0127717 A1    Jun. 16, 2005

(30) Foreign Application Priority Data
Dec. 10, 2003    (JP)    ............ P 2003-411292

(51) Int. Cl.
*B60J 7/00*    (2006.01)
(52) U.S. Cl. .............. 296/203.02; 296/193.09
(58) Field of Classification Search .......... 296/187.09, 296/193.09, 203.02, 187.12, 193.05, 203.03
See application file for complete search history.

(56) References Cited

FOREIGN PATENT DOCUMENTS
JP    7-132856    5/1995

*Primary Examiner*—Lori L. Coletta
(74) *Attorney, Agent, or Firm*—McDermott Will & Emery LLP

(57) ABSTRACT

A vehicle front structure of the present invention includes a hood ridge extended along a fore-and-aft direction of a vehicle in an upper edge portion of a vehicle front, a front side member extended along the fore-and-aft direction of the vehicle in a lower edge portion of the vehicle front, and a strut housing located between the hood ridge and the front side member. Further, the structure includes a hood ridge lower front portion composed in a manner that a rear edge portion thereof is connected to a front-side surface of the strut housing, and that an upper edge portion thereof and a lower edge portion thereof are connected to the hood ridge and the front side member, respectively. The hood ridge lower front portion has a hood ridge lower front outer member and a hood ridge lower front inner member. The hood ridge lower front inner member is provided to be spaced from the hood ridge lower front outer member at a predetermined interval and forms a closed cross section together with the hood ridge lower front outer member.

3 Claims, 4 Drawing Sheets

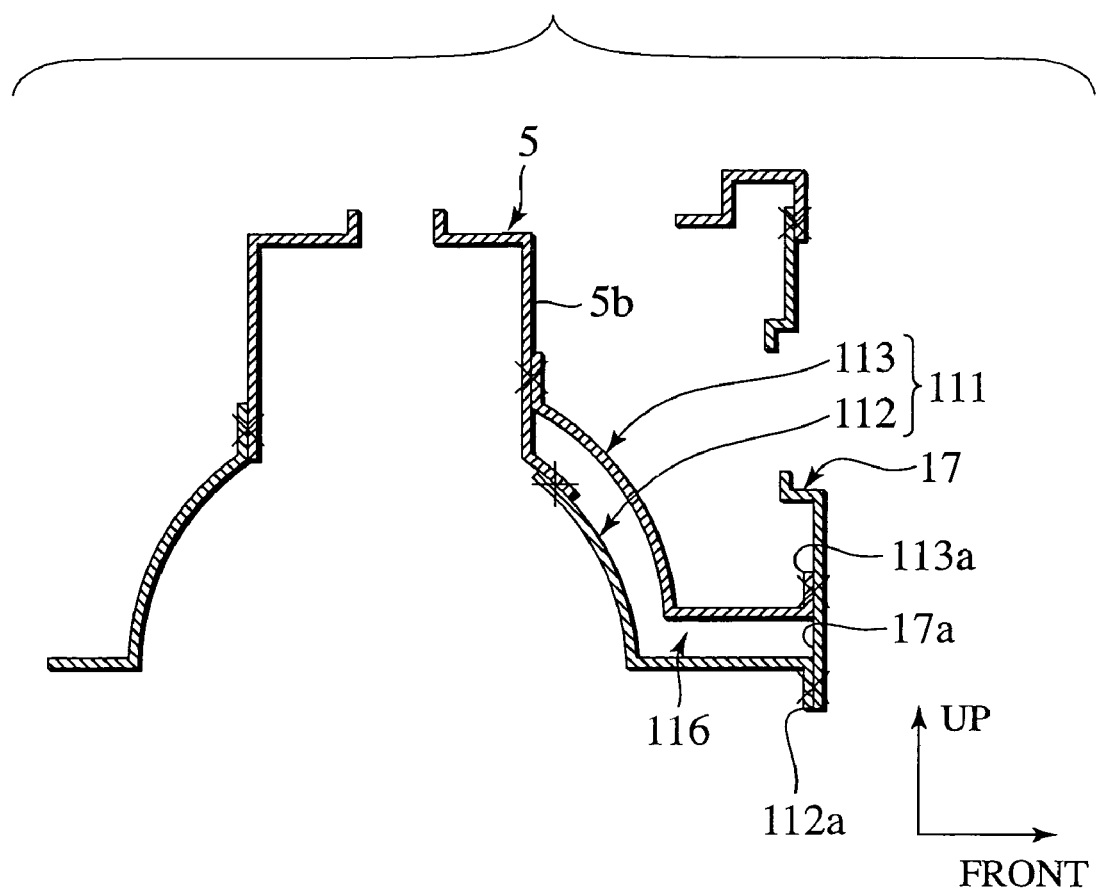

VEHICLE FRONT STRUCTURE

BACKGROUND OF THE INVENTION

1. Field of the Invention

The present invention relates to a vehicle front structure which is provided in a front portion of a vehicle and improves body rigidity of the vehicle.

2. Description of the Related Art

Heretofore, there has been known a vehicle front structure as shown in FIG. 1, which is applied to a peripheral edge of an engine room provided in a front portion of a vehicle (refer to Japanese Patent Application Laid-Open No. H7-132856).

A configuration of the conventional vehicle front structure will be described. In this conventional vehicle front structure, on both left and right sides of an engine room 2 provided in a front portion of a vehicle 1, hood ridges 3, each of which has a closed cross-sectional structure and is extended along a fore-and-aft direction of the vehicle, are provided on upper edges of both of the sides. Further, along lower edges thereof, front side members 4, each of which has a closed cross-sectional structure, are extended in the fore-and-aft direction of the vehicle.

A strut housing 5 is provided between each of these hood ridges 3 and each of these front side members 4. This strut housing 5 is configured so as to bear a load applied from an unillustrated suspension.

Moreover, in this engine room 2, in front of the strut housing 5 in the vehicle, one hood ridge lower front member 6 is provided. This hood ridge lower front member 6 has a rear edge portion 6a connected to the strut housing 5, and has upper and lower edge portions 6b and 6c connected to the hood ridge 3 and the front side member 4, respectively.

Next, an operation of this conventional vehicle front structure will be described.

In the conventional vehicle front structure thus configured, when a load mainly in a vertical direction is applied to the strut housing 5 from the unillustrated suspension, this applied load is dispersed and absorbed to the hood ridge lower front member 6 provided in a periphery of this strut housing 5.

SUMMARY OF THE INVENTION

However, in the conventional vehicle front structure, when the load is applied to the strut housing 5 from the unillustrated suspension, the hood ridge lower front member 6 is apt to be deformed in inner and outer directions of a surface thereof because this hood ridge lower front member 6 is one piece.

As described above, when the vehicle front structure is not a structure capable of obtaining desired strength for body rigidity in the vicinity of such a part to which the suspension is attached, there has been a problem that it is difficult to improve handling characteristics and stability of the vehicle.

Moreover, noise in the engine room 2 is apt to propagate to the outside of the vehicle because the hood ridge lower front member 6 is one piece. Accordingly, there has also been a problem that it is difficult to improve silence by lowering the noise heard in the outside of the vehicle.

The present invention has been accomplished to solve the above problem. It is an object of the present invention to provide a vehicle front structure which is capable of improving the handling characteristics and stability of the vehicle by improving the body rigidity thereof, and has excellent silence.

According to one aspect of the present invention, there is provided a vehicle front structure comprising: a hood ridge extended along a fore-and-aft direction of a vehicle in an upper edge portion of a vehicle front; a front side member extended along the fore-and-aft direction of the vehicle in a lower edge portion of the vehicle front; a strut housing located between the hood ridge and the front side member; and a hood ridge lower front portion composed in a manner that a rear edge portion thereof is connected to a front-side surface of the strut housing, and that an upper edge portion thereof and a lower edge portion thereof are connected to the hood ridge and the front side member, respectively, wherein the hood ridge lower front portion includes a hood ridge lower front outer member and a hood ridge lower front inner member, and the hood ridge lower front inner member is provided to be spaced from the hood ridge lower front outer member at a predetermined interval, and forms a closed cross section together with the hood ridge lower front outer member.

BRIEF DESCRIPTION OF THE DRAWINGS

The invention will now be described with reference to the accompanying drawings wherein;

FIG. 7 is a cross-sectional view taken along a line corresponding to the line V—V in FIG. 2 in the vehicle front structure of Embodiment 2.

DETAILED DESCRIPTION OF THE PREFERRED EMBODIMENT

Figure 1:
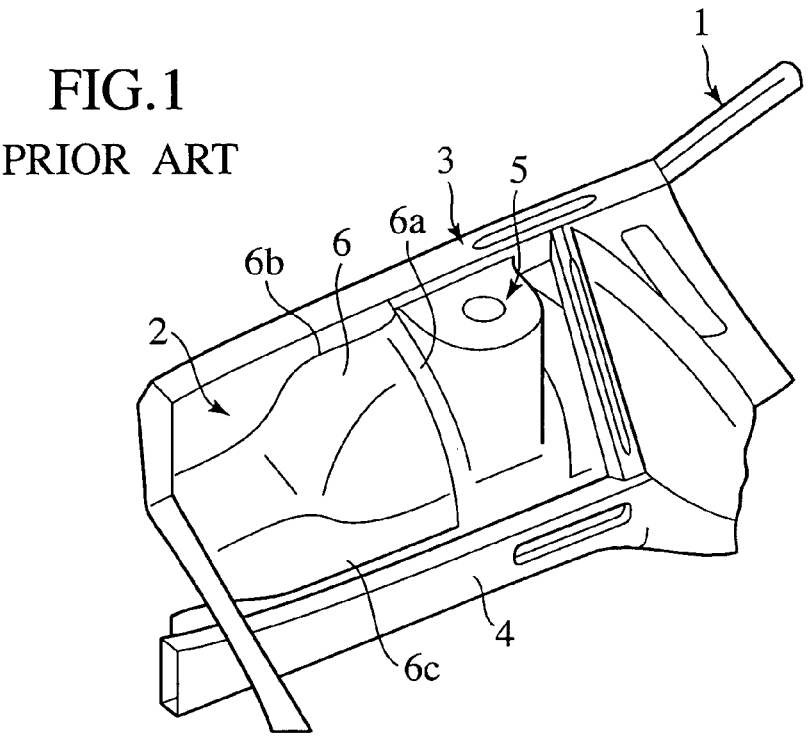
FIG. 1 is a perspective view for explaining a configuration of principal portions in a vehicle front structure of a conventional example.

FIGS. 2 to 7 are views showing vehicle front structures in the best mode for carrying out the present invention. Note that portions same as and equivalent to those in the conventional example will be described while adding the same reference numerals thereto. Moreover, in the drawings, "FRONT" indicates a front direction of a vehicle, "UP" indicates a vertical direction of the vehicle, "INSIDE" indicates an inner direction of a vehicle width direction, and "OUTSIDE" indicates an outer direction of the vehicle width direction.

Figure 2:
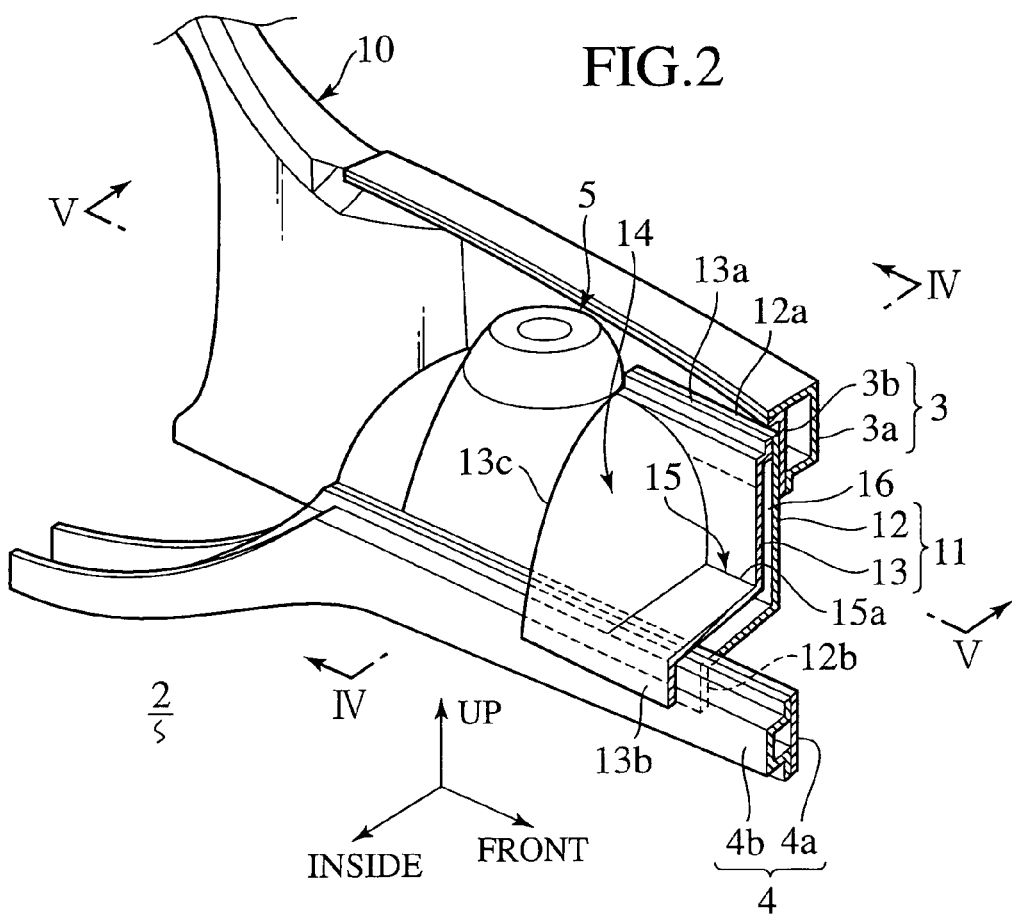
FIG. 2 is a perspective view showing a vehicle front structure of Embodiment 1, and explaining a configuration of a side surface in an engine room.
Figure 3:
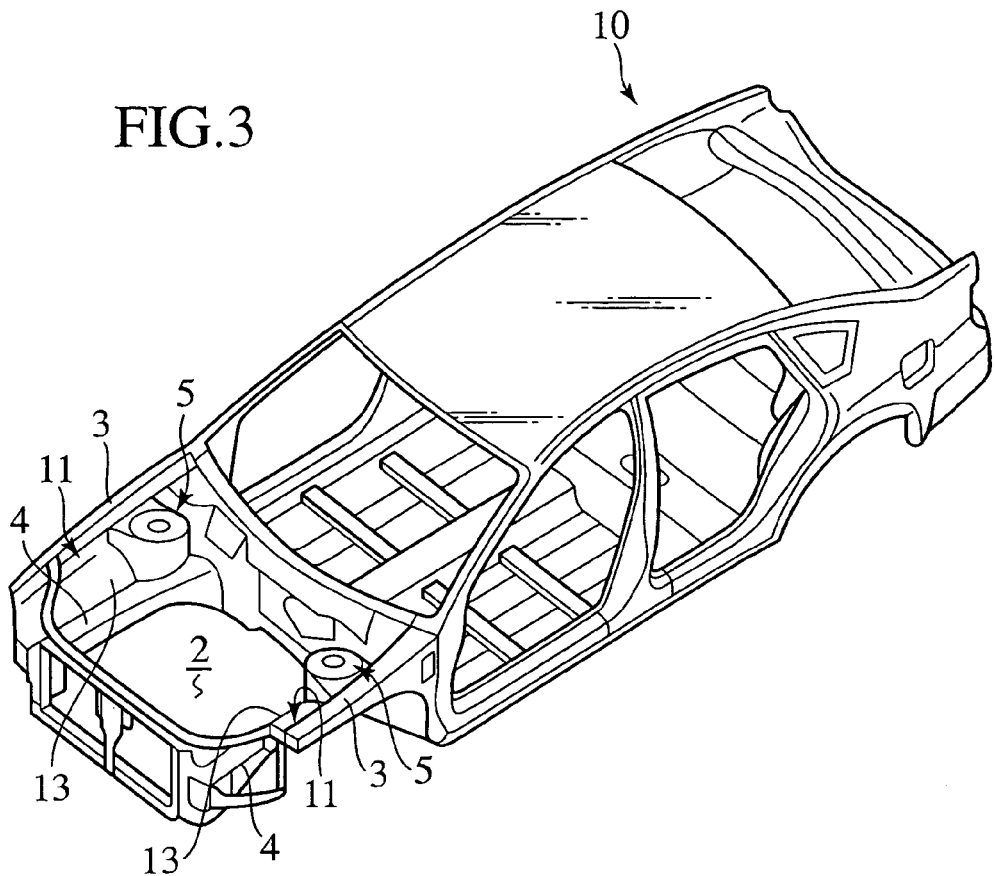
FIG. 3 is a perspective view showing the vehicle front structure of Embodiment 1, and explaining an overall vehicle configuration.
Figure 4:
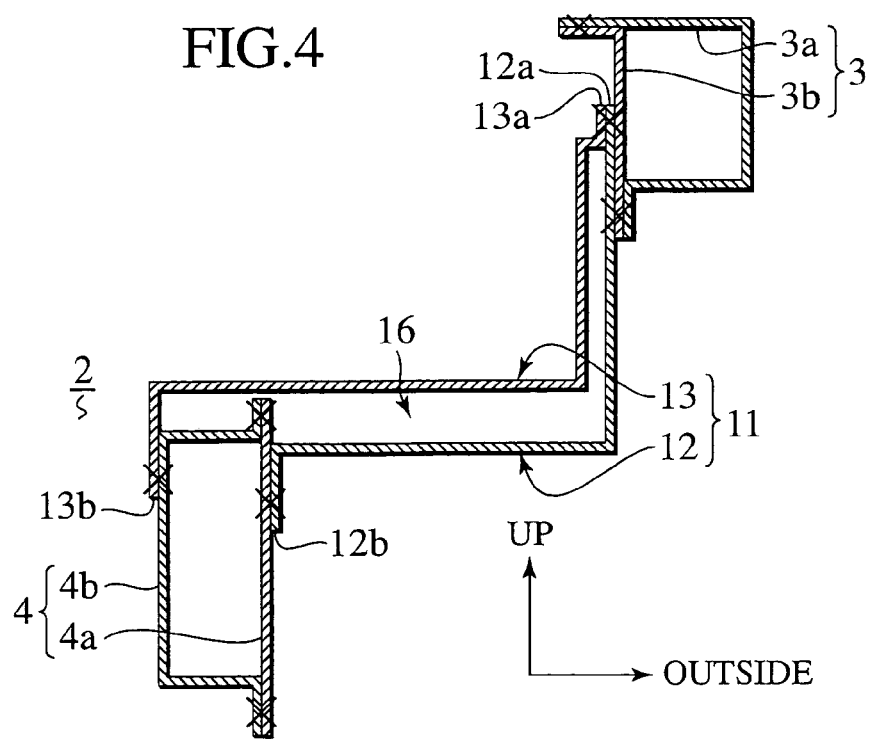
FIG. 4 is a cross-sectional view taken along a line IV—IV in FIG. 2 in the vehicle front structure of Embodiment 1.

First, a configuration of the vehicle front structure will be described. In the vehicle front structure of the present invention, as shown in FIG. 3, on both left and right sides of an engine room 2 provided in a front portion of a vehicle 10, hood ridges 3, each of which has a closed cross-sectional structure and is extended along a fore-and-aft direction of the vehicle, are provided on upper edge portions of both of the sides. As shown in FIG. 2 or 4, each of these hood ridges 3 is configured to form a closed cross section of a substantially rectangular shape in a manner that a hood ridge upper outer member 3a and a hood ridge upper inner member 3b are joined together from the inside and the outside in the vehicle width direction.

Moreover, on left and right lower edges in this engine room 2, front side members 4 and 4, each of which has a closed cross-sectional structure, are extended along the fore-and-aft direction of the vehicle. As shown in FIG. 2 or 4, each of these front side members 4 and 4 is configured to form a closed cross section of a substantially rectangular shape in a manner that a front side member outer 4a and a front side member inner 4b are joined together from the inside and the outside in the vehicle width direction.

Furthermore, a strut housing 5 is provided to be located between each of these hood ridges 3 and each of these front side members 4. This strut housing 5 is configured so as to bear a load applied thereto from an unillustrated suspension and to disperse and transmit the load to a hood ridge lower front portion 11 provided in front of the strut housing 5 in the vehicle, and to the hood ridge 3 and the front side member 4.

The present invention will be described below in each of the embodiments.

Embodiment 1

FIGS. 2 to 5 show Embodiment 1 as one of the best embodiments of the present invention.

The hood ridge lower front portion 11 of this Embodiment 1 includes a hood ridge lower front outer member 12, and a hood ridge lower front inner member 13, and is configured to form a two-layer structure of these two members 12 and 13. In this case, the hood ridge lower front inner member 13 is provided in a more inner direction of the engine room 2 than the hood ridge lower front outer member 12 so as to be spaced therefrom at a predetermined interval. Moreover, together with the hood ridge lower front outer member 12, the hood ridge lower front inner member 13 forms a closed cross section 16 from the strut housing 5 to the vicinity of an unillustrated front end module along the fore-and-aft direction of the vehicle 10.

Figure 5:
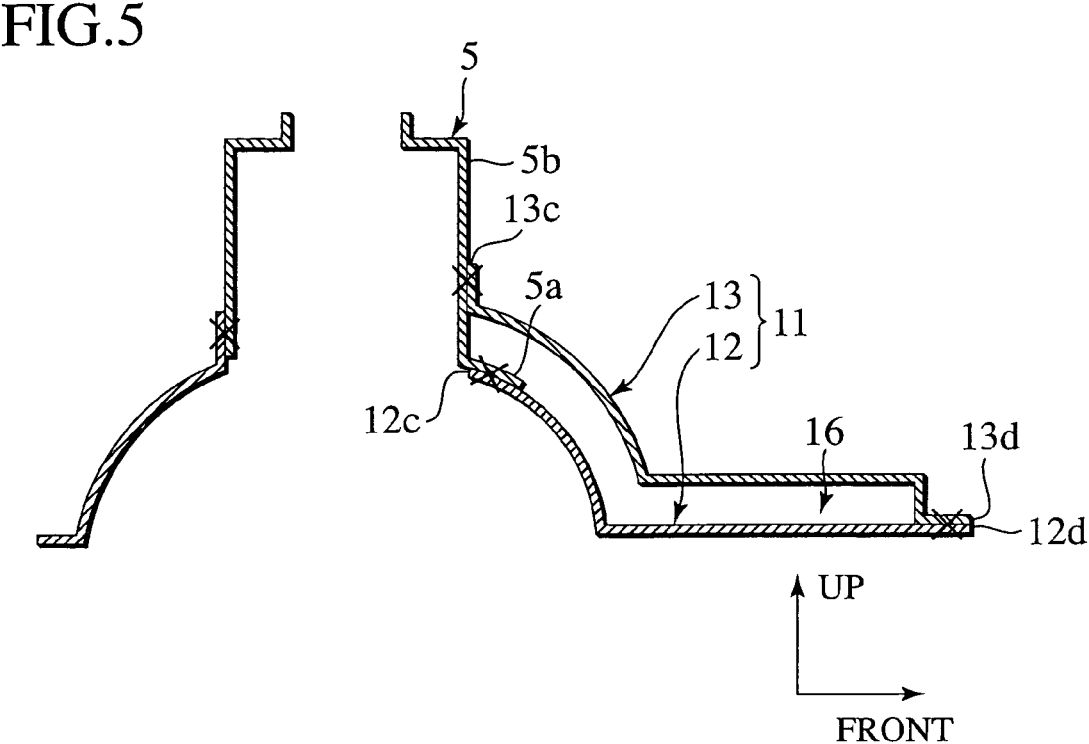
FIG. 5 is a cross-sectional view taken along a line V—V in FIG. 2 in the vehicle front structure of Embodiment 1.

In this configuration, an upper edge portion 12a of the hood ridge lower front outer member 12 is joined to an inner surface of the hood ridge upper inner member 3b together with the hood ridge lower front inner member 13. A lower edge portion 12b of this hood ridge lower front outer member 12 is joined to an outer surface of the front side member outer 4a. Moreover, a lower edge portion 13b of the hood ridge lower front inner member 13 is joined to an engine room-side side surface of the front side member inner 4b. Furthermore, as shown in FIG. 5, a rear edge portion 12c of this hood ridge lower front outer member 12 is joined to a lower end portion 5a of a vehicle front-side surface 5b of the strut housing 5. Moreover, a rear edge portion 13c of the hood ridge lower front inner member 13 is joined to a vehicle front-side surface 5b of the strut housing 5 while being spaced upward from the lower end portion 5a to which the rear edge portion 12c is joined. Then, a front edge portion 12d of the hood ridge lower front outer member 12 and a front edge portion 13d of the hood ridge lower front inner member 13 are joined together and closed in a vertical direction at a vehicle front position.

Moreover, as shown in FIG. 2, in the hood ridge lower front inner member 13, a cabin-side swelling portion 14 swelling toward an inner direction of the engine room 2, and a shelf portion 15 bent to a substantially L-character shape and having an internal corner portion 15a concave toward the outer direction of the engine room 2, are integrally arranged to be adjacent to each other in matching with a shape of the strut housing 5, and concave and convex shapes are alternately formed. Thus, rigidity of the hood ridge lower front inner member 13 in inner and outer directions of surfaces thereof is further improved.

Next, an operation of the vehicle front structure of this Embodiment 1 will be described.

In this Embodiment 1, the closed cross section 16 is formed of the hood ridge lower front outer member 12 and the hood ridge lower front inner member 13. Therefore, rigidity in a periphery of the strut housing 5 is improved, thus making it possible to set body rigidity in the vicinity of such a part to which the suspension is attached at desired strength. Hence, handling characteristics and stability of the vehicle can be improved.

Moreover, in the hood ridge lower front portion 11, the hood ridge lower front outer member 12 and the hood ridge lower front inner member 13 form the side surface of the engine room into the two-layer structure. Therefore, engine noise can be restricted from transmitting to the outside of the vehicle, and accordingly, it is made possible to improve silence by lowering the noise heard in the outside of the vehicle.

Moreover, as shown in FIG. 5, the front edge portion 12d of the hood ridge lower front outer member 12 and the front edge portion 13d of the hood ridge lower front inner member 13 are joined together and closed in the vertical direction at the vehicle front position. Therefore, body rigidity of the vehicle front can be further improved. Hence, rigidity of a front end is improved. Accordingly, while a front end module attached to the front end has heretofore had to be composed of steel, the front end module can be composed of a resin material in this Embodiment 1, thus making it possible to achieve a weight reduction thereof.

Moreover, in each of the hood ridge lower front portions 11, the hood ridge lower front outer member 12 and the hood ridge lower front inner member 13 form the side surface portion on each of both of the left and right sides of the engine room 2 into the two-layer structure. Therefore, reaction force of the body in the case of a frontal offset collision is further improved, thus making it possible to further improve collision safety.

Furthermore, in the hood ridge lower front portion 11, a harness through hole can be set in the hood ridge lower front inner member 13, and a harness can be inserted into the inside of the closed cross section 16 formed of the hood ridge lower front outer member 12 and the hood ridge lower front inner member 13. With such a configuration, even if a harness protector that has been separately provided is removed, the harness is protected by the hood ridge lower front outer member 12 and the hood ridge lower front inner member 13. Hence, the number of parts can be reduced, and an increase of manufacturing cost can be suppressed.

In addition, in this Embodiment 1, as shown in FIG. 2, in the hood ridge lower front inner member 13, the cabin-side swelling portion 14 swelling toward the inner direction of the engine room 2, and the shelf portion 15 bent to a substantially L-character shape and having the internal corner portion 15a concave toward the outer direction of the engine room 2, are integrally arranged to be adjacent to each other in matching with the shape of the strut housing 5, and the concave and convex shapes are alternately formed. Therefore, the rigidity of the hood ridge lower front inner member 13 in the inner and outer directions of the surfaces thereof can be further improved, and the handling characteristics and the stability can be made favorable.

Embodiment 2

Figure 6:
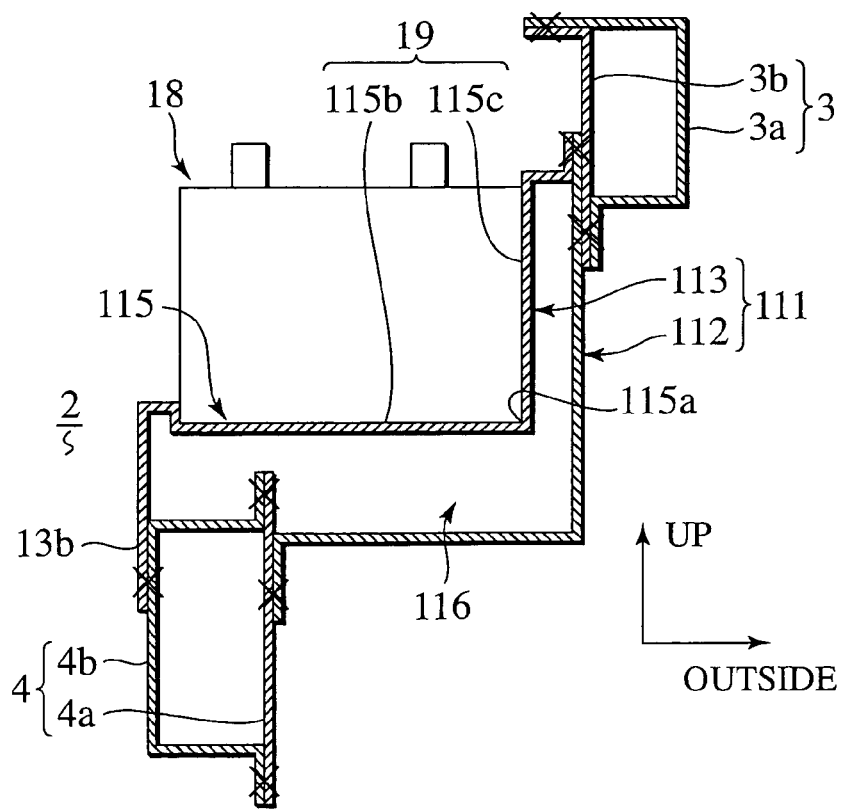
FIG. 6 is a cross-sectional view taken along a line corresponding to the line IV—IV in FIG. 2 in a vehicle front structure of Embodiment 2.

FIGS. 6 and 7 are views showing a vehicle front structure of Embodiment 2 of the present invention. Note that portions same as and equivalent to those in the above-described Embodiment 1 will be described while adding the same reference numerals thereto.

First, a configuration of the vehicle front structure will be described. In a hood ridge lower front portion 111 of the vehicle front structure of this Embodiment 2, a closed cross section 116 is formed of a hood ridge lower front outer member 112 and a hood ridge lower front inner member 113.

In this Embodiment 2, a front end portion 112*a* of the hood ridge lower front outer member 112 and a front end portion 113*a* of the hood ridge lower front inner member 113 are individually joined to an inner side surface 17*a* of a radiator core side panel member 17 at the vehicle front position.

Moreover, on a shelf portion 115 of the hood ridge lower front inner member 113, a battery tray portion 115*b* which mounts and attaches a battery 18 thereonto is formed into a concave shape. The battery tray portion 115*b* constitutes a battery bracket portion 19 on which the battery 18 is fixed and held together with an inner side surface portion 115*c* provided continuously therewith through an internal corner portion 115*a*.

Next, an operation of the vehicle front structure of this Embodiment 2 will be described.

In the vehicle front structure of this Embodiment 2, in addition to the operation and effect of the above-described Embodiment 1, further, the front end portion 112*a* of the hood ridge lower front outer member 112 and the front end portion 113*a* of the hood ridge lower front inner member 113 are individually joined to the inner side surface 17*a* of the radiator core side panel member 17 at the vehicle front position. Accordingly, the closed cross section 116 extended in the fore-and-aft direction of the vehicle is obtained from the vehicle front-side surface 5*b* of the strut housing 5 to the radiator core side panel member 17. Therefore, the body rigidity of the vehicle can be further improved.

Moreover, in the hood ridge lower front portion 111 of this Embodiment 2, a double panel structure is formed of the hood ridge lower front outer member 112 and the hood ridge lower front inner member 113. Accordingly, rigidity of a portion of the closed cross section 116 is improved. Even if the battery tray portion 115*b* which mounts and attaches the battery 18 thereonto is formed into the concave shape by use of the shelf portion 115 of the hood ridge lower front inner member 113, sufficient support strength can be obtained. Therefore, a degree of freedom in layout of the battery 18 and the like in the engine room 2 can be improved.

Other configurations, operations and effects are the same as and equivalent to those of the above-described Embodiment 1, and accordingly, description thereof will be omitted.

As above, the vehicle front structures of Embodiments 1 and 2 as the best embodiments of the present invention have been described in detail with reference to the drawings. However, specific configurations of the vehicle front structure are not limited to these Embodiments, and design changes to an extent without departing from the gist of the present invention are incorporated in the present invention.

For example, in the above-described Embodiment 1, as shown in FIG. 5, the front edge portion 12*b* of the hood ridge lower front outer member 12 and the front edge portion 13*d* of the hood ridge lower front inner member 13 are joined together and closed in the vertical direction at the vehicle front position. However, the present invention is not limited to this. For example, the frond edge portions 12 and 13 may be joined together in the vehicle width direction. Alternatively, even if an open end is provided, it is satisfactory if the closed cross section is formed of the two pieces, which are the hood ridge lower front outer member 12, and the hood ridge lower front inner member 13.

The entire content of a Japanese Patent Application No. P2003-411292 with a filing date of Dec. 10, 2003 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A vehicle front structure, comprising:
a hood ridge extended along a fore-and-aft direction of a vehicle in an upper edge portion of a vehicle front;
a front side member extended along the fore-and-aft direction of the vehicle in a lower edge portion of the vehicle front;
a strut housing located between the hood ridge and the front side member; and
a hood ridge lower front portion composed in a manner that a rear edge portion thereof is connected to a front-side surface of the strut housing, and that an upper edge portion thereof and a lower edge portion thereof are connected to the hood ridge and the front side member, respectively,
wherein the hood ridge lower front portion includes a hood ridge lower front outer member and a hood ridge lower front inner member, and
the hood ridge lower front inner member is provided to be spaced from the hood ridge lower front outer member at a predetermined interval, and forms a closed cross section together with the hood ridge lower front outer member.

2. The vehicle front structure of claim 1,
wherein the hood ridge lower front outer member and the hood ridge lower front inner member are closed in a vertical direction at a vehicle front position.

3. The vehicle front structure of claim 1,
wherein the hood ridge lower front outer member and the hood ridge lower front inner member are individually joined to a radiator core side panel member at a vehicle front position.

* * * * *